United States Patent [19]

Watanabe et al.

[11] 4,343,536
[45] Aug. 10, 1982

[54] ELECTRO-OPTIC LIGHT DEFLECTOR

[75] Inventors: Takaya Watanabe; Teruo Matsuba, both of Tokyo, Japan

[73] Assignee: Nippon Electric Co., Ltd., Tokyo, Japan

[21] Appl. No.: 149,274

[22] Filed: May 12, 1980

[30] Foreign Application Priority Data

| May 15, 1979 | [JP] | Japan | 54-59569 |
| Nov. 14, 1979 | [JP] | Japan | 54-147418 |
| Jan. 28, 1980 | [JP] | Japan | 55-8549 |
| Feb. 27, 1980 | [JP] | Japan | 55-23542 |
| Feb. 27, 1980 | [JP] | Japan | 55-23543 |
| Feb. 27, 1980 | [JP] | Japan | 55-24383 |

[51] Int. Cl.³ ............................................. G02B 5/14
[52] U.S. Cl. ................................. 350/355; 350/96.14
[58] Field of Search ............... 350/355, 380, 381, 382, 350/383, 392, 96.14

[56] References Cited

U.S. PATENT DOCUMENTS

| 3,887,885 | 6/1975 | Hattori et al. | 350/96.14 |
| 3,958,862 | 5/1976 | Scibor-Rylski | 350/381 |
| 4,243,300 | 1/1981 | Richards et al. | 350/355 |

Primary Examiner—R. A. Rosenberger
Attorney, Agent, or Firm—Laff, Whitesel, Conte & Saret

[57] ABSTRACT

An electro-optic material has at least a pair of confronting elongated electrodes formed on at least one surface thereof. Preferably, each of the electrodes has a plurality of elongated, spaced parallel fingers which interleave with each other (sometimes called "interdigital electrodes"). When a high-frequency signal is applied across the electrodes, the refractive index changes in a linear or nonlinear manner within a layer of the body of the electro-optic material which is near the electrodes. The amount of the index change may be varied by a proper selection of materials, signals and geometrical material configuration.

22 Claims, 19 Drawing Figures

FIG. 18

| CONDITIONS | 1 | 2 | 3 | 4 | 5 | 6 | 7 | 8 |
|---|---|---|---|---|---|---|---|---|
| EMBODIMENT | 1 | 1 | 2 | 3 | 3 | 4 | 5 | 6 |
| STRUCTURE | Fig. 1 | Fig. 1 | Fig. 8 | Fig. 10 | Fig. 1 | Fig. 8 | Fig. 13 | Fig. 16 |
| CHARACTERISTIC | Fig. 3 | Fig. 7 | Fig. 9 | Fig. 11 | | Fig. 12 | Fig. 14 | |
| MATERIAL OF SUBSTRATE | $LiNbO_3$ | PLZT | $Bi_{12}GeO_{20}$ | $PbMoO_4$ | Glass ($SiO_2$ 38%; PbO 60%) | $TiO_2$ | $LiNbO_3$ | $PbMoO_4$ |
| DEFLECTION ANGLE (Degree) | 1.7 | 4.1 | 0.65 | 2.4 | 0.2 | 0.6 | 4 | 6 |
| APPLIED VOLTAGE (Volt) | 28 | 14 | 18 | 20 | 20 | 40 | 28 | 20 |
| DRIVE-FREQUENCY (MHz) | 40 | 109 | 185 | 240 | 180 | 0 (Direct) | 40 | 240 |
| DIMENSION OF SUBSTRATE (Length x Width x Thickness) | 14 (mm) x 12 (mm) x 2 (mm) | 10x10x2 | 16x16x0.5 | 11x11x2 | 13x13x1 | 10x10x1 | 14x12x2 | 11x11x2 |
| DIAMETER OF LIGHT BEAM (μ) | 200 | 200 | 200 | 200 | 200 | 200 | 200 | 200 |
| INCIDENT POSITION OF BEAM (mm) (Distance from Surface) | 0.2 | 0.2 | 0.2 | 0.2 | 0.2 | 0.2 | 0.2 | 0.2 |
| INTERDIGITAL ELECTRODES — NUMBER OF PAIRS | 20 | 16 | | 16 | 16 | | 20 | 16 |
| INTERDIGITAL ELECTRODES — GAP OF ELECTRODE (μ) | 15 | 16 | | 16 | 16 | | 15 | 16 |
| INTERDIGITAL ELECTRODES — WIDTH OF ELECTRODE (μ) | 15 | 16 | | 16 | 16 | | 15 | 16 |
| INTERDIGITAL ELECTRODES — THICKNESS OF ELECTRODE (Å) | 1000 | 1000 | | 1000 | 1000 | | 1000 | 1000 |
| INTERDIGITAL ELECTRODES — LENGTH OF OVERLAPPED ELECTRODE (mm) | 10 | 8 | | 8 | 10 | | 10 | 10 |
| COPLANAR ELECTRODES — LENGTH OF ELECTRODE (mm) | | | 15 | | | 10 | | |
| COPLANAR ELECTRODES — WIDTH OF ELECTRODE (mm) | | | 0.3 | | | 0.2 | | |
| COPLANAR ELECTRODES — GaP OF ELECTRODE (μ) | | | 25 | | | 10 | | |
| COPLANAR ELECTRODES — THICKNESS OF ELECTRODE (Å) | | | 1000 | | | 1000 | | |

ELECTRO-OPTIC LIGHT DEFLECTOR

This invention relates to electro-optic light deflectors for controlling the deflection of a light beam in response to an applied electrical signal.

To improve the signal processing speed of a data processing system or a communication system, as well as to simplify the structure thereof, recent research and development efforts have been directed to printers and facsimile apparatuses based on photoelectric devices. An electro-optic deflector is indispensable to such a system. In such a deflector, a light beam is supplied, for example, from a laser, and is both spatially and periodically controlled in response to an electrical deflection signal.

For example, a conventional electro-optic deflector is shown in U.S. Pat. No. 3,887,885 (Reference 1) and, more particularly, in FIG. 2 thereof. This patent shows a deflector including an electro-optic crystal with interdigital electrodes ("IDE's") formed on the crystal surface. An extremely low voltage having a high frequency is applied to these IDE's in response to a modulating signal. This patented deflector utilizes a diffraction phenomenon which occurs within a layer near the surface of the crystal. However, the deflection of an incident light beam depends on the refractive index of the layer, and that index varies periodically in the direction of the width of the IDE's. As a result, the deflector of this patent cannot provide a large deflection angle.

This patented system uses an optical modulator which requires an extremely high voltage of about twenty kilovolts to be applied to an electro-optic crystal, such as gadolinium molybdate. This voltage rotates the phase of the light beam, for the modulation.

A typical optical light modulator is disclosed in an article by N. G. Theophous, entitled "A $Gd_2(MoO_4)_3$ Longitudinal Electrooptic Modulator at 6328 Å," IEEE Journal OF Quantum Electronics, pp. 507–510, August issue, 1976 (Reference 2). However, this light modulator requires a high-voltage generating circuit, resulting in a complicated and costly device.

Therefore, an object of the present invention is to provide a simplified light deflector which is free from the above-described disadvantages and is capable of providing a comparatively large deflection angle.

The present invention is based on the discovery that a certain kind of light transmissive crystal exhibits a linear or nonlinear distribution of its refractive index when an electrical field is applied to it, the linear or nonlinear distribution occurring in the thickness direction. Consequently, a light beam which is incident to the crystal, in a direction perpendicular to its thickness, is deflected in the thickness direction while travelling therethrough.

According to the present invention, the deflector comprises a plate or body of a light transmissive material, interdigital electrodes formed on the surface of the material, and a voltage source for generating a control voltage. The voltage is applied to the electrodes to change the distribution of the refractive index in its thickness direction. Thereafter, a light beam incident upon one end surface of the body is deflected in response to the change in distribution of the refractive index formed within the material.

Next, the invention will be described in detail in conjunction with the accompanying drawings, in which:

FIG. 18 shows conditions of measurements for obtaining the deflection angle vs. the applied voltage relationships corresponding to the materials for the light transmissive body.

Throughout the drawings, the same reference numerals are used to identify the same structural elements.

The first embodiment of the invention (FIG. 1) comprises a light transmissive body 1 made of a material having a trigonal crystal structure, such as lithium niobate ($LiNbO_3$) or lithium tantalate ($LiTaO_3$). A plurality of interdigital electrodes (IDE's) 2 are formed on the surface of the body 1, by any suitable photolithographical method, for example. A high-frequency voltage source 3 is connected to supply the IDE's 2. The IDE's are preferably made from three successive layers of chromium (Cr), platinum (Pt) and gold (Au), respectively, formed one after another on the upper surface of body 1. The IDE's extend parallel to the direction of the incident light beam. For details about a suitable lithographic method, reference may be made to column 6 of Reference 1.

Figure 1:
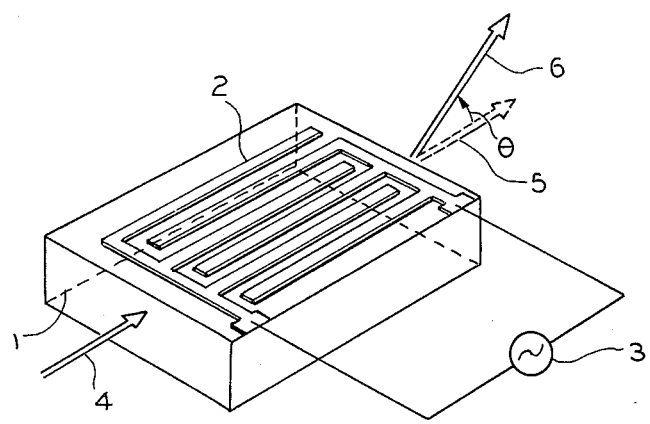
FIG. 1 is a perspective view of a first embodiment of the invention.

A light beam 4 is incident to one end surface of the body 1 and is deflected upwardly at an angle, as indicated in FIG. 1 by an arrow 6. This deflection occurs in response to a change in the refractive index developed within the body 1, the index change occurring in the thickness direction of the body 1 responsive to the high-frequency voltage applied to the IDE's.

The principle of the deflection of the light beam is next described with reference to FIGS. 2A and 2B.

Figure 2A:
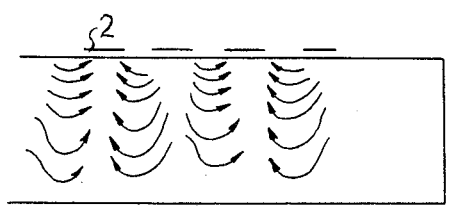
FIGS. 2A and 2B are diagrams for describing the principle of the present invention.
Figure 2B:
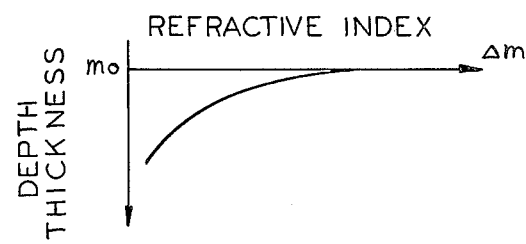

An application of the high-frequency voltage to the IDE's 2 creates an electric field intensity within the body 1, not only along its surface but also at various points lying beneath the surface in the thickness direction, as shown in FIG. 2A. The distribution of the field intensity changes the refractive index from a large value near the upper surface of the body 1 to a small value near the bottom of the body, as shown in FIG. 2B. Consequently, a light beam incident upon the end surface of the body 1 is deflected upwardly by an angle of (+), in response to the refractive index distribution. If no voltage is applied to the IDE's 2, the light beam 4 leaves the body 1 in the non-deflected direction, as shown by a dashed line arrow 5 in FIG. 1.

Figure 3:
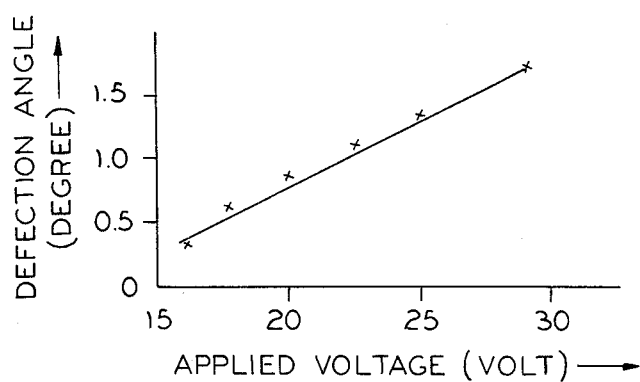
FIGS. 3, 4 and 5 are graphs representing the relationship between an applied voltage, a light beam incident position, a modulating signal frequency, and a deflection angle, respectively.

FIG. 3 shows the relationship between a deflection angle and a voltage applied to the body 1, which is lithium niobate. The deflection angles were measured and are shown in FIG. 18 for various conditions and factors including the voltage and frequency of the applied signal, the types of the electrodes, the dimensions and materials of the body 1, the diameter of the incident light beam, and the incident position of the light beam within the body. These conditions are shown in FIG. 18, where condition 1 corresponds to the embodiment of FIG. 1.

From FIG. 3, if the applied voltage is very low (i.e., lower than 15V), a change in the refractive index takes place in the vicinity of the surface layer alone. Consequently, the incident light beam cannot really be deflected as it is deflected in the disclosure of Reference 1. If the applied voltage is high (for example, above a few hundred volts), then the lines of electric force are distributed in parallel within the region between the two surfaces of the body 1. Accordingly, the refractive index within the body 1 does not undergo any change, such as the changes described for the modulator in Reference 2. Therefore, the light beam is not directed at all.

Consequently, it follows that an optimum voltage must be applied for changing the distribution of the refractive index in the thickness direction of the body. It will also be noted from FIGS. 2A and 2B that the region of the body 1 in which the refractive index exhibits the change is limited to the vicinity of the region in which the IDE's 2 are formed. This indicates that an increase in the electrode length contributes to an increase in the deflection angle.

Figure 4:
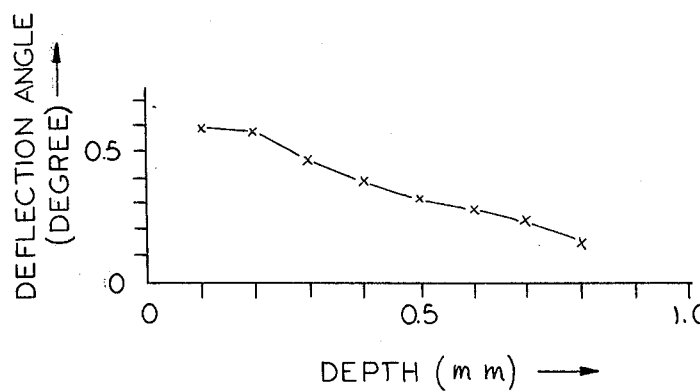

FIG. 4 shows the relationship between the deflection angle and the incident position of a light beam (a distance from the top surface of the body to the point of incidence). This graph is shown relative to the deflector of FIG. 1. The relationship is for a modulating signal of 40 megahertz (MHz) and 20 volts. It will be noted that the refractive index of the body 1 changes with the increase in the distance from the surface of the body 1 to the point of incidence, as shown in FIG. 2A.

Figure 5:
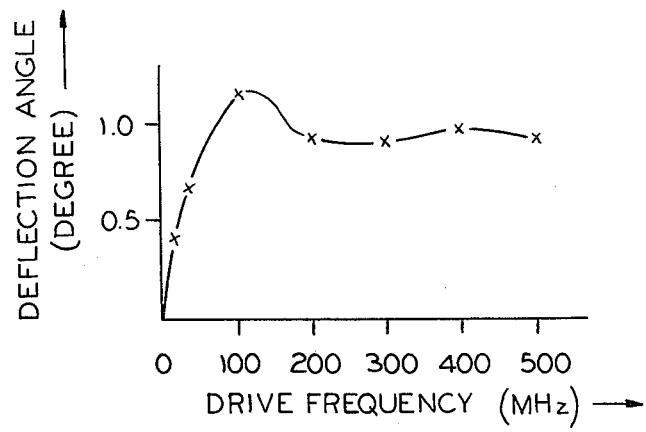

FIG. 5 shows a curve setting forth the deflection angle versus the modulating signal frequency characteristics of the light deflector of FIG. 1. The voltage is fixed at 20 volts and the light beam 4 is incident to a point which is 0.2 millimeters down from the surface of the body. The curve (FIG. 5) indicates that the deflection angle is controllable, not only by the voltage, but also by the frequency of the modulating signal within a frequency range extending up to 100 MHz.

The high-frequency voltage generating circuit 3 (FIG. 6) used in FIG. 1, includes a transistor $3_1$ which is switched responsive to a sequence of square input pulses. An integration circuit $3_2$ integrates the output of the transistor $3_1$ and a shaping circuit $3_3$ shapes the output of the integration circuit $3_2$ into a sawtooth wave. If the resulting sawtooth wave is applied to the IDE's 2 in FIG. 1, the light beam from the output side of the body is continuously deflected from the position 5 (shown by dotted lines) to the position 6 (shown by solid lines). The amount of the deflection is in response to the voltage level of the sawtooth wave. The light transmissive body and electrodes are formed of a trigonal crystal material and the described layered IDE's. However, the crystal may be formed of various other materials and the IDE's may be formed in various other configurations.

Figure 7:
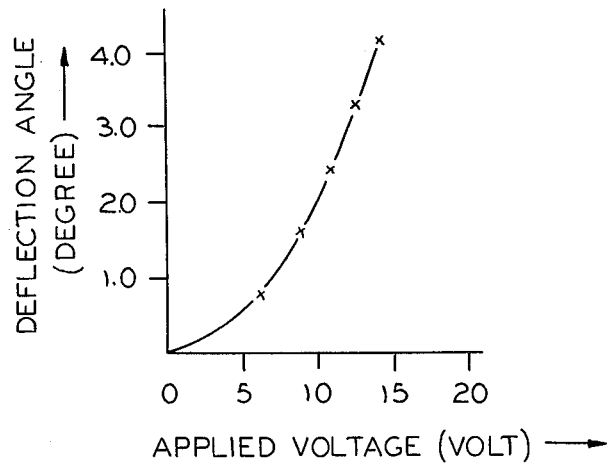
FIG. 7 is a graph representing another deflection angle to modulating signal voltage relationship in the first embodiment.

FIG. 7 is a curve showing the deflection angle vs. the applied voltage characteristics for the body 1 which is made of a polycrystal transparent ceramic (PLZT), with the light beam incident to the body 1, and satisfying the conditions 2 (FIG. 18). With this structure, the light beam is deflected upwardly, based upon the principle of FIGS. 2A and 2B.

Figure 8:
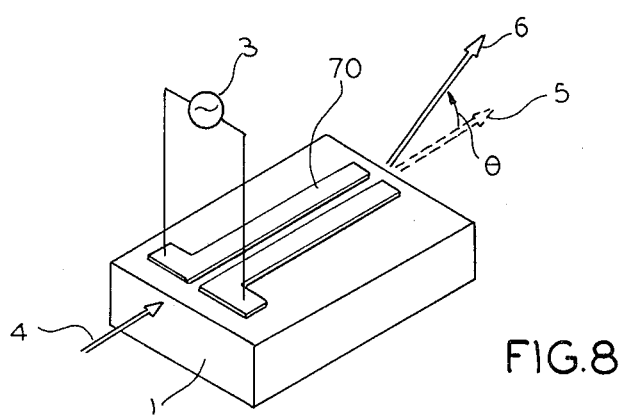
FIG. 8 and 10 are perspective views of second and third embodiments, respectively.

FIG. 8 shows a second embodiment of the invention wherein the body 1 is made of bismuth germanium oxide ($Bi_{12}GeO_{20}$), one of the cubic crystals, and of coplanar electrodes 70.

Figure 9:
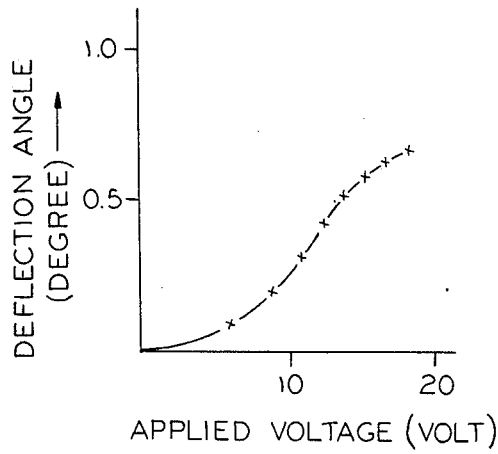
FIGS. 9 and 11 are graphs representing the deflection angle vs. the applied voltage relationships for the second and third embodiments.

FIG. 9 gives a curve showing the deflection angle vs. the applied voltage characteristics for the second embodiment using the body 1 made of $Bi_{12}GeO_{20}$, with the light beam made incident thereto, and satisfying conditions 3, given in FIG. 18.

Figure 10:
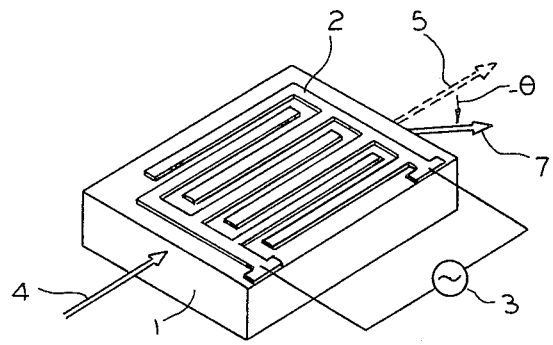

In FIG. 10, the third embodiment of the invention includes a body 1 made of lead molybdate ($PbMoO_4$) having a tetragonal crystal structure. In a tetragonal crystal body, the change in the distribution of the refractive index, due to the high-frequency voltage, is reverse to the distribution shown in FIG. 2A. More specifically, the refractive index in the vicinity of the upper surface of the body 1 is smaller than the index in the vicinity of the lower surface. Consequently, the light beam 4 is deflected downwardly by an angle of $(-\theta)$, as represented by an output light beam 7 in FIG. 10.

Figure 11:
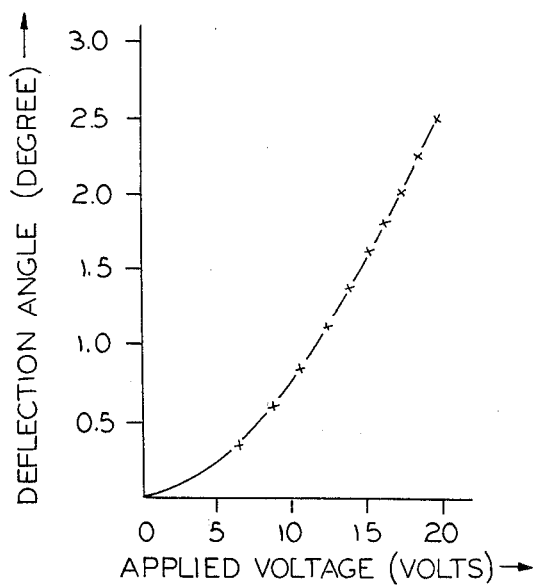

FIG. 11 shows a curve for the third embodiment, representing the deflection vs. the applied voltage characteristics for the light beam which is incident to the body 1 of $PbMoO_4$ and which satisfies the conditions 4 shown in FIG. 18.

When the light beam is incident to the body 1 under conditions 5, shown in FIG. 18, and with the body 1 made of an amorphous material such as glass (mainly including thirty-eight weight percent $SiO_2$ and sixty weight percent PbO), the deflection angle is 0.2°. The light beam is deflected upwardly, as in the embodiment of FIG. 1. In addition to the above-mentioned embodiments, various modifications of the present deflector can be made by using other materials shown in Table 1.

In the tetragonal crystal group shown in Table 1, rutile ($TiO_2$) has a small lattice spacing. This material gives a refractive index change which is similar to the change in a block made from $PbMoO_4$, even when a direct current voltage is applied. By the use of such a crystal, a light deflector can be provided free from the above-mentioned circuit 3.

Figure 12:
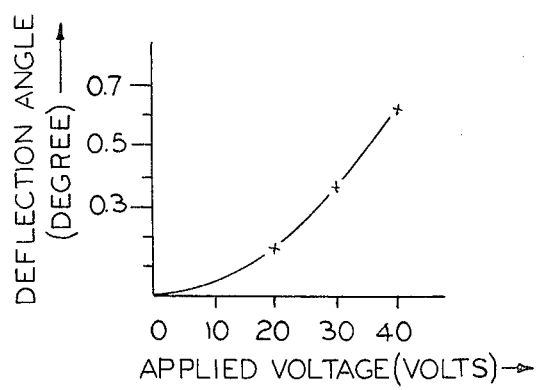
FIG. 12 is a graph representing the deflection angle vs. the applied voltage relationship for the third embodiment.

FIG. 12 shows another deflection angle vs. the applied voltage characteristics for a light beam which is incident to the rutile body, with the incidence satisfying conditions 6 shown in FIG. 18.

A fourth embodiment of the present invention (FIG. 13) is adapted to provide a larger deflection angle. The light transmissive body 8 is made of lithium niobate and has a light beam output side surface which is tapered toward the bottom of the body. The interdigital electrodes IDE's 2 are formed on the upper surface of the body 8, by a photolithographical process. A circuit 3 applies a high-frequency voltage to the IDE's 2. Unless the high-frequency voltage is applied to the body 8, the light beam 4 which is incident to the body 8 emanates in the downwardly angled direction, as represented by an arrow 9. If a high-frequency voltage is applied to the body 8, the incident light beam 4 is deflected upwardly, at an angle $\alpha$ and in the direction of arrow 10. The deflection is due to a change in the refractive index distribution. The difference between the normal beam and the deflected beam is indicated by the angle $\beta$.

Figure 13:
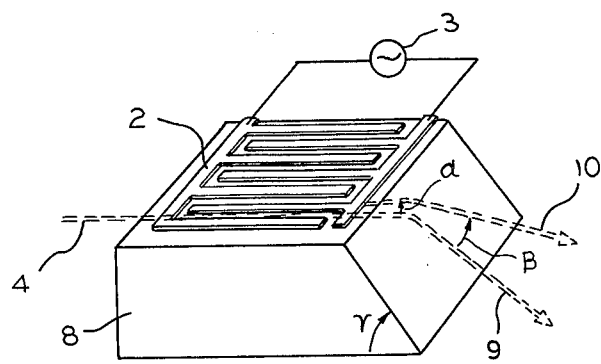
FIG. 13 is a perspective view of a fourth embodiment of the present invention.
Figure 14:
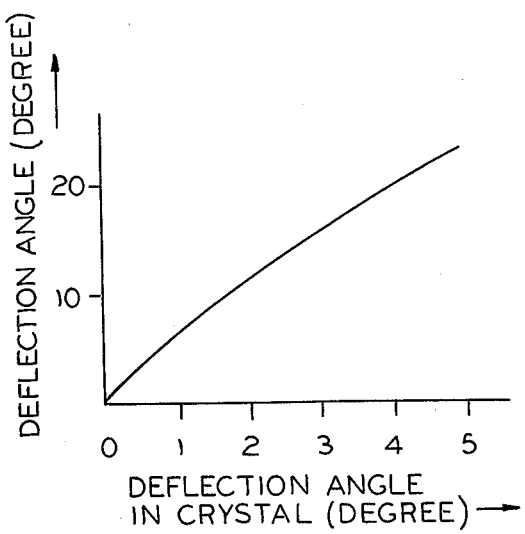
FIG. 14 is a graph representing the deflection angle vs. the applied voltage relationship in the fourth embodiment.

FIG. 14 is a graph representing the relationship between the deflection angle $\alpha$ of a light beam incident to the body made of LiNbO3 and the deflection angle $\beta$ of the output light beam. Each deflection angle is obtained by a calculation according to Snell's law, where the side surface of the body 8 (FIG. 13) is tapered at an angle, which is 65°. The light beam is transmitted into the body 8 under the conditions 7 (FIG. 18). Therefore, it is observed from FIG. 14 that the deflection angle is greatly increased, as compared to the deflection angle of FIG. 1.

TABLE 1

| | Optical Material Used | Direction of Deflection |
| --- | --- | --- |
| Polycrystal | (Pb, La) (Zr, Ti) O3 or (Pb, Bi) (Zr, Ti) O3 | $+\theta$ |
| Amorphous Material | glass (SiO2 38%, PbO 60%), TeO2 glass, or As2S3 glass | $+\theta$ |
| Crystal | | |
| Triclinic Crystal | CsH3(SeO3) | $+\theta$ |
| Trigonal Crystal | LiNbO3 or LiTaO3 | $+\theta$ |
| Monoclinic Crystal | C(CH2OH)4 or Ca2Nb2O7 | $+\theta$ |
| Hexagonal Crystal | TeO2, YAlO3 or SiO2 | $+\theta$ |
| Rhombic Crystal | α-HIO3, Ba2NaNb5O15, or Rochelle salt | $+\theta$ |
| Cubic Crystal | Y3Al5O12, Gd3Ga5O12, Bi12GeO20, GaAs, ZnS, or GaP | $+\theta$ |
| Tetragonal Crystal | PbMoO4, TiO2, CaWO4, BaTiO3, KH2PO4, or NH4H2PO4 | $-\theta$ |

Figure 6:
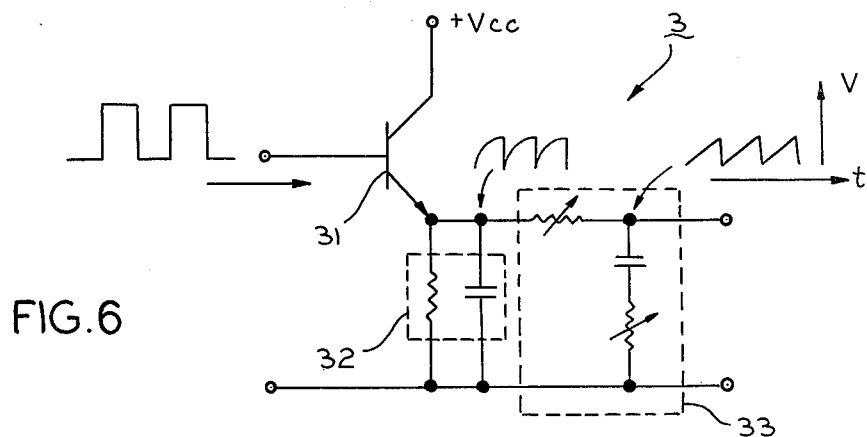
FIG. 6 is a circuit diagram showing a part of the first embodiment.
Figure 15:
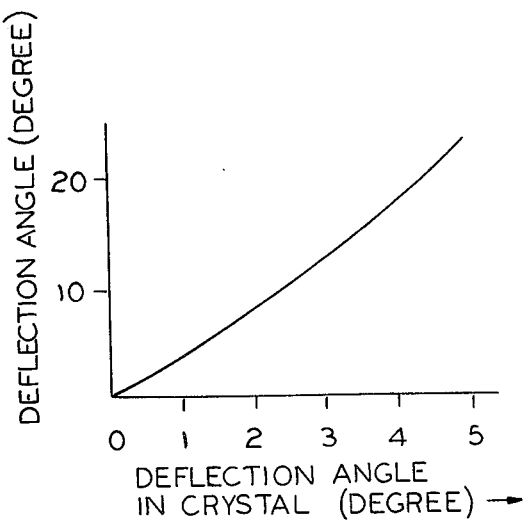
FIG. 15 is a graph representing another deflection angle vs. the applied voltage relationship in the fourth embodiment.

FIG. 15 shows the relationship between the deflection angle $\alpha$ and the deflection angle $\beta$, when tapering angle $\gamma$ of the body 8 (FIG. 13) is 110°. As a result, it may be inferred that the deflection angle $\beta$ changes in a substantially linear manner relative to the deflection angle $\alpha$ of the incident light. In the embodiment of FIG. 13, the deflection angle $\alpha$ is controlled by the applied high-frequency voltage. The incident light beam is continuously deflected in response to the sawtooth wave voltage which is applied to the IDE's, from the voltage source (FIG. 6).

Figure 16:
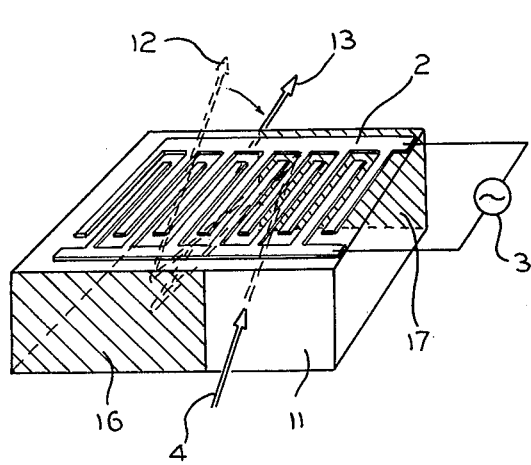
FIGS. 16 and 17 are perspective views of fifth and sixth embodiments, respectively.

The fifth embodiment (FIG. 16) is adapted to provide a larger deflection angle. The light transmissive body 11 is made of $P_bM_oO_4$ and has silver reflection films 16 and 17 formed on a part of the light-beam incident surface and the light-beam output surface. A high-frequency voltage source 3, and IDE's 2 are formed on the top surface of the body 11 in order to change the refractive index of the body 11 in response to the high-frequency voltage fed from the source 3.

With this structure, it is assumed that the light beam 4 is incident to a portion of the surface of the body 11 which does not have a reflection film associated therewith. In the absence of the high-frequency voltage applied to the IDE's 2, the incident light beam 4 is reflected by the reflection film 17 and then re-reflected by the reflection film 16. The resulting beam normally emanates from the output surface of the body 11, as indicated by the dashed line arrow 12. With the high-frequency voltage applied to the IDE's 2, the incident light beam 4 is deflected due to the refractive index change within the body 11. Then, the deflected light beam is reflected back into the body 11, by the reflection film 17, as indicated by the solid line arrow. The reflected light beam is again deflected within the body 11, and then re-reflected by the reflection film 16, and once again deflected within the body 11. Eventually, the light beam emanates from block 11, in the direction shown by the solid line arrow 13.

This embodiment (FIG. 16) is equivalent to a body 11 which is lengthened to provide a larger deflection angle. In this embodiment, the light beam incident to the body 11 satisfies conditions 8 (FIG. 18). The incident light beam is deflected by 6 degrees.

Figure 17:
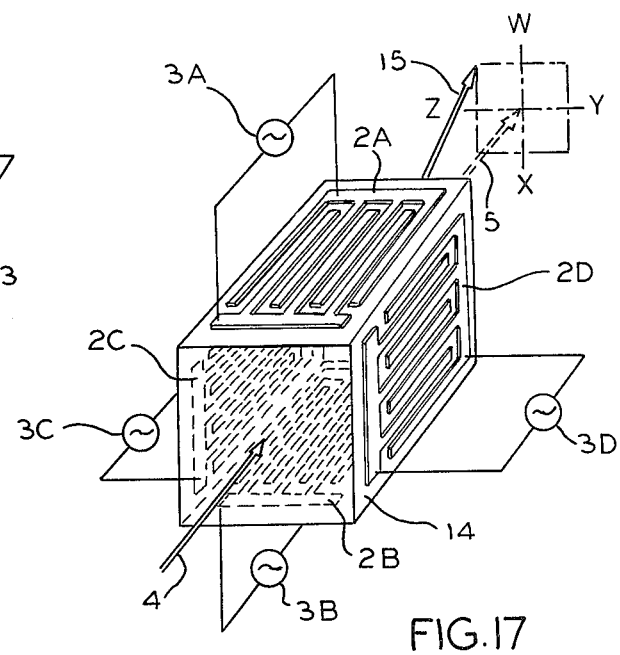

FIG. 17 shows a sixth embodiment of the invention which comprises a rectangular parallelepiped body 14, made of light transmissive lithium niobate. Interdigital electrodes (IDE's) 2A and 2B are formed on the top and bottom surfaces of the body 14. These IDE's are arranged to deflect the incident light beam in the vertical direction (w and x directions). The interdigital electrodes IDE's 2C and 2D are formed on opposing left and right side surfaces of the substrate 14. These IDE's are arranged to cause a deflection of the incident light beam in the horizontal direction (y and z directions). The high-frequency voltage source 3A to 3D apply a high-frequency voltage to these IDE's 2A through 2D. In this structure, the light beam 4 is deflected in a desired direction, in response to the high-frequency voltages applied from the sources 3A through 3D to the IDE's 2A to 2D.

While preferred embodiments of the invention have been described, many modifications can be made by those skilled in the art within the scope of the claimed invention.

What is claimed is:

1. an electro-optic light deflector comprising:
   a. a light transmissive body means capable of experiencing a change in its refractive index when subjected to an electric field;
   b. a plurality of elongaged electrode means arranged on the surface of said body;
   c. at least one voltage source means for generating a predetermined voltage; and
   d. means for applying said predetermined voltage to said electrodes to change the refractive index of said body means in at least one layer area defined by and adjacent to said electrodes, said refractive index changing in the thickness direction of said body which is perpendicular to said electrodes, said refractive index change being such that a light beam incident to one end surface reaches the opposite end surface without coupling to the surface of said body which bears said electrodes;

whereby a light beam incident to one end surface of said body travels through said body in a direction generally aligned with said electrodes and is deflected in response to said predetermined voltage.

2. An electro-optic light deflector as claimed in claim 1, wherein said body is made of a triclinic crystal comprising $CsH_3(SeO_3)$.

3. An electro-optic light deflector as claimed in claim 1, wherein said body is made of a trigonal crystal material chosen from the group consisting of $LiNbO_3$ and $LiTaO_3$.

4. An electro-optic light deflector as claimed in claim 1, wherein said body is made of a monoclinic crystal material chosen from the group consisting of $C(CH_2OH)_4$ and $Ca_2Nb_2O_7$.

5. An electro-optic light deflector as claimed in claim 1, wherein said body is made hexagonal crystal material chosen from the group consisting of $TeO_2$, $YAlO_3$ and $SiO_2$.

6. An electro-optic light deflector as claimed in claim 1, wherein said body is made of a rhombic crystal material chosen from the group consisting of $\alpha\text{-}HIO_3$, $Ba_2NaNb_5O_{15}$, and Rochelle salt.

7. An electro-optic light deflector as claimed in claim 1, wherein said body is made of a cubic crystal material chosen from the group consisting of $Y_3Al_5O_{12}$, $Gd_3Ga_5O_{12}$, $Bi_{12}GeO_{20}$, GaAs, ZnS and GaP.

8. An electro-optic light deflector as claimed in claim 1, wherein said body is made of a tetragonal crystal material chosen from the group consisting of $PbMoO_4$, $TiO_2$, $CaWO_4$, $BaTiO_3$, $KH_2PO_4$ and $NH_4H_2PO_4$ and said predetermined voltage is a direct current voltage.

9. An electro-optic light deflector as claimed in claim 1, wherein said body is made of a polycrystal material chosen from the group consisting of (Pb, La) (Zr, Ti)$O_3$ and (Pb, Bi) (Zr, Ti)$O_3$.

10. An electro-optic light deflector as claimed in claim 1, wherein said body is in amorphous state of a material chosen from the group consisting of glass of ($SiO_2$, PbO), glass of $TeO_2$ and glass of $As_2S_3$.

11. An electro-optic light deflector as claimed in claim 1, wherein said electrodes are interdigital electrodes.

12. An electro-optic light deflector as claimed in claim 1, wherein said electrodes are coplanar electrodes.

13. An electro-optic light deflector as claimed in claim 1, wherein said body has a light-beam output surface tapered toward one surface thereof.

14. An electro-optic light deflector as claimed in claim 1, wherein a reflection film is formed on one of light-beam incident surface and light-beam output surface of said body.

15. An electro-optic light deflector as claimed in claim 1, wherein said voltage source is a sawtooth wave-generating circuit.

16. An electro-optic light deflector as claimed in claim 1, wherein said voltage source is a high-frequency voltage-generating circuit.

17. An electro-optic light deflector comprising:
 a. a parallelepiped light transmissive body means capable of changing its refractive index when subjected to an electric field;
 b. first through fourth electrode means arranged on first through fourth side surfaces of said parallelepiped body, respectively, the light-beam incident surface and the light-beam output surface thereof being free of said electrode means, each of said electrodes having a plurality of interdigital electrodes;
 c. first through fourth voltage source means for generating individual voltages;
 d. means for applying said individual voltages to associated ones of said electrodes to change in the refractive index within an area of said parallelepiped which is defined by said electrode means, said index changing in the direction of the thickness of said body;

whereby a light beam incident onto one end surface of said body is deflected in response to said voltage.

18. A method of switching a light beam from a normal path into a deflected path, said method comprising the steps of:
 a. directing a beam of light onto a first surface of a pair of spaced parallel surfaces at opposite ends of an electro-optical crystal material which has at least a pair of elongated electrodes formed onto a second surface perpendicular to said first surface, said electrodes extending substantially across said second surface in alignment with the beam of light; and
 b. applying a voltage having a frequency at least as high as approximately 40 MHz across said pair of electrodes to change the refractive index within said crystal material, said refractive index changing so that said beam of light directed onto said first surface reaches the spaced parallel surface at the opposite end of said material without coupling to the second surface ofe said body.

19. The method of claim 18 wherein said electro-optical crystal material is a trigonal crystal.

20. The method of claim 18 wherein said electro-optical crystal is tetragonal crystal.

21. The method of claim 18 wherein said crystal is made from a material taken from a group consisting of: lithium niobate, lithium tantalate, a polycrystal transparent ceramic, bismuth germanium oxide, lead molybdate, rutile, and amorphous material approximately 38% $SiO_2$ and 60% PbO.

22. The method of claim 18 and the added step of forming said electrodes from successive layers of chromium, platinum and gold.

* * * * *